US012342121B2

(12) United States Patent
Sabin et al.

(10) Patent No.: US 12,342,121 B2
(45) Date of Patent: Jun. 24, 2025

(54) MICROPHONE PLACEMENT IN OPEN EAR HEARING ASSISTANCE DEVICES

(71) Applicant: Bose Corporation, Framingham, MA (US)

(72) Inventors: Andrew Todd Sabin, Chicago, IL (US); Ryan C. Struzik, Hopkinton, MA (US); Aric J. Wax, Watertown, MA (US); Daniel M. Gauger, Jr., Berlin, MA (US)

(73) Assignee: Bose Corporation, Framingham, MA (US)

( * ) Notice: Subject to any disclaimer, the term of this patent is extended or adjusted under 35 U.S.C. 154(b) by 24 days.

(21) Appl. No.: 16/534,588

(22) Filed: Aug. 7, 2019

(65) Prior Publication Data

US 2021/0044888 A1 Feb. 11, 2021

(51) Int. Cl.
*H04R 1/10* (2006.01)

(52) U.S. Cl.
CPC ........... *H04R 1/1066* (2013.01); *H04R 1/105* (2013.01); *H04R 2205/022* (2013.01)

(58) Field of Classification Search
None
See application file for complete search history.

(56) References Cited

U.S. PATENT DOCUMENTS

| | | | | |
|---|---|---|---|---|
| 8,073,150 | B2 | 12/2011 | Joho et al. | |
| 8,073,151 | B2 | 12/2011 | Joho et al. | |
| 9,794,676 | B2 | 10/2017 | Shetye et al. | |
| 9,794,677 | B2 | 10/2017 | Shetye et al. | |
| 9,881,600 | B1 * | 1/2018 | Shetye | G10K 11/178 |
| 9,980,042 | B1 | 5/2018 | Benattar | |
| 10,013,999 | B1 | 7/2018 | Fadell et al. | |
| 10,353,221 | B1 | 7/2019 | Graff et al. | |
| 11,736,853 | B2 | 8/2023 | Jain et al. | |
| 2005/0201585 | A1 | 9/2005 | Jannard et al. | |
| 2005/0248717 | A1 | 11/2005 | Howell | |

(Continued)

FOREIGN PATENT DOCUMENTS

WO WO 2016/167877 10/2016

OTHER PUBLICATIONS

U.S. Appl. No. 16/151,541, filed Oct. 4, 2018.

(Continued)

*Primary Examiner* — Walter F Briney, III
(74) *Attorney, Agent, or Firm* — Fish & Richardson P.C.

(57) ABSTRACT

A head-worn acoustic device includes at least one acoustic transducer disposed such that, in a head-worn state, the transducer is in an open-ear configuration in which an ear canal of a user of the head-worn acoustic device is unobstructed. The acoustic device also includes at least one microphone configured to capture audio that is processed and played back through the transducer, and an amplifier circuit configured to process signals representing the audio captured using the microphone and generate driver signals for the transducer. The transducer and the microphone are disposed on the head-worn acoustic device such that, in the head-worn state, a lobe of a radiation pattern of the at least one acoustic transducer is directed towards the ear canal of the user, and the at least one microphone is positioned in an acoustic null in a radiation pattern of the at least one acoustic transducer.

19 Claims, 4 Drawing Sheets

(56) References Cited

U.S. PATENT DOCUMENTS

| | | | | |
|---|---|---|---|---|
| 2008/0152183 | A1* | 6/2008 | Janik | H04M 1/05 381/375 |
| 2011/0064238 | A1* | 3/2011 | Haas | H04R 1/2807 381/71.6 |
| 2012/0282976 | A1 | 11/2012 | Suhami | |
| 2012/0300956 | A1 | 11/2012 | Horii | |
| 2014/0268016 | A1 | 9/2014 | Chow | |
| 2014/0270231 | A1 | 9/2014 | Dusan et al. | |
| 2015/0016638 | A1* | 1/2015 | Hebenstreit | H04R 5/0335 381/151 |
| 2016/0112817 | A1* | 4/2016 | Fan | H04R 29/004 381/94.7 |
| 2016/0192066 | A1 | 6/2016 | Benattar | |
| 2017/0064463 | A1 | 3/2017 | Greenberger | |
| 2017/0201823 | A1* | 7/2017 | Shetye | H04R 1/1091 |
| 2017/0295437 | A1* | 10/2017 | Bertelsen | H04R 25/405 |
| 2017/0353793 | A1 | 12/2017 | Sun et al. | |
| 2017/0353804 | A1* | 12/2017 | Homayoun | G10L 21/0364 |
| 2018/0005622 | A1 | 1/2018 | Kyllonen et al. | |
| 2018/0033419 | A1 | 2/2018 | Shetye | |
| 2018/0270565 | A1 | 9/2018 | Ganeshkumar | |
| 2019/0052954 | A1 | 2/2019 | Rusconi et al. | |
| 2019/0138603 | A1* | 5/2019 | Daley | H04R 1/406 |
| 2019/0174237 | A1* | 6/2019 | Lunner | G06F 3/011 |
| 2019/0189106 | A1 | 6/2019 | Hull et al. | |
| 2019/0239006 | A1* | 8/2019 | Petersen | H04R 25/65 |
| 2019/0378491 | A1 | 12/2019 | Mohammed | |

OTHER PUBLICATIONS

U.S. Appl. No. 16/408,179, filed May 9, 2019.

International Search Report and Written Opinion in International Appln. No. PCT/US2020/045007, dated Oct. 2, 2020, 10 pages.

International Search Report and Written Opinion in International Appln. No. PCT/US2020/045298, dated Oct. 2, 2020, 12 pages.

International Preliminary Report on Patentability in International Appln. No. PCT/US20/045007, dated Feb. 17, 2022, 7 pages.

International Preliminary Report on Patentability in International Appln. No. PCT/US2020/045298, dated Feb. 17, 2022, 9 pages.

Office Action in European Appln. No. 20760699.7, mailed on Mar. 7, 2024, 6 pages.

* cited by examiner

MICROPHONE PLACEMENT IN OPEN EAR HEARING ASSISTANCE DEVICES

TECHNICAL FIELD

This disclosure generally relates to wearable open-ear acoustic devices.

BACKGROUND

Wearable audio devices, such as off-ear headphones, produce sound using an electro-acoustic transducer that is spaced from the user's ear canal entrance. These wearable audio devices may take various form factors. In some cases, these wearable audio devices include audio eyeglasses configured to rest on the ears and nose of the user. The audio eyeglasses can include transducers proximate one or both of the user's ears, e.g., located on the arms of the eyeglasses.

SUMMARY

In one aspect, this document features a head-worn acoustic device that includes at least one acoustic transducer disposed such that, in a head-worn state, the at least one acoustic transducer is in an open-ear configuration in which an ear canal of a user of the head-worn acoustic device is unobstructed. The acoustic device also includes at least one microphone configured to capture audio that is processed and played back through the at least one acoustic transducer, and an amplifier circuit configured to process signals representing the audio captured using the at least one microphone and generate driver signals for the at least one acoustic transducer. The at least one acoustic transducer and the at least one microphone are disposed on the head-worn acoustic device such that, in the head-worn state, a lobe of a radiation pattern of the at least one acoustic transducer is directed towards the ear canal of the user, and the at least one microphone is positioned in an acoustic null in a radiation pattern of the at least one acoustic transducer.

In another aspect, this document features a head-worn acoustic device that includes at least one acoustic transducer disposed such that, in a head-worn state, the at least one acoustic transducer is in an open-ear configuration in which an ear canal of a user of the head-worn acoustic device is at least partially unobstructed. The acoustic device also includes at least one microphone configured to capture audio that is processed and played back through the at least one acoustic transducer, and an amplifier circuit configured to process signals representing the audio captured using the at least one microphone to generate a first signal for the at least one acoustic transducer. The acoustic device also includes an echo cancellation circuit configured to process the signals representing the audio captured using the at least one microphone to generate a second signal for the at least one acoustic transducer, wherein a combination of the first signal and second signal reduces coupling between the at least one acoustic transducer and the at least one microphone by at least 3 dB.

Implementations of the above aspects can include one or more of the following features. The at least one acoustic transducer and the at least one microphone can be disposed along a temple of an eye-glass frame. The acoustic device can include at least one microphone that is disposed on a front portion of the eyeglass frame. The at least one microphone can be a portion of an array of multiple microphones disposed along the temple of the eyeglass frame. The acoustic device can include one or more processing devices configured to implement a beamforming process based on audio captured using the multiple microphones of the array. The beamforming process can be configured to preferentially capture audio from a gaze-direction of the user. The at least one acoustic transducer and the at least one microphone can be disposed on an open-ear headphone. The at least one microphone can be a portion of an array of multiple microphones disposed on the open-ear headphone. The acoustic device can include one or more processing devices configured to implement a beamforming process based on audio captured using the multiple microphones of the array. A power ratio of (i) a portion of output of the at least one acoustic transducer radiated towards the ear canal of the user and (ii) a portion of output of the at least one acoustic transducer radiated towards the at least one microphone can beat least 1 dB. The at least one acoustic transducer can be a part of an array of acoustic transducers. In the head-worn state, a physical separation can exist between the at least one acoustic transducer and either the ear canal of the user or a concha or pinna of the user. The at least one acoustic transducer can include an acoustic dipole.

Various implementations described herein may provide one or more of the following advantages. An array of microphones disposed in an open-ear device can facilitate directional capture, for example, to amplify audio coming from a particular direction (e.g., look/gaze direction of the user). One or more acoustic transducers can facilitate delivery of audio to user's ears without significant coupling to the microphones. In some cases, one or more of the microphones can be disposed at locations substantially close to the ears such that signals detected by such microphone(s) can be used as a reference for an echo canceler. Use of such echo cancelers can potentially improve the quality of audio delivered to the user's ears thereby improving the user experience.

In some cases, the open-ear devices can also include a feedforward and/or feedback active noise reduction (ANR) signal paths that can be configured to improve a signal to noise ratio (SNR) from a particular direction (e.g., look/gaze direction of the user) by at least 5 dB. Such improvement over a particular portion of the spectrum (e.g., a portion of the speech band) can potentially improve speech intelligibility for some users. The noise reduction (possibly in combination with the directional capture/amplification) in turn can improve the feasibility of using open-ear devices not only as hearing aids, but also generally as hearing assistance devices that improve speech intelligibility for users who do not have hearing loss.

In general, the technology described herein can potentially improve the acoustic performances of open-ear audio devices such as audio eyeglasses or head-mounted acoustic devices. In some cases, the improvements in directional capture, SNR, and/or reduction in coupling between microphones and acoustic transducers can facilitate the use of open ear devices as hearing aids. Such open-ear form factors can make hearing aids more acceptable (e.g., from a social use standpoint) to some users, particularly ones who are hesitant to use them otherwise.

Two or more of the features described in this disclosure, including those described in this summary section, may be combined to form implementations not specifically described herein. The details of one or more implementations are set forth in the accompanying drawings and the description below. Other features, objects, and advantages will be apparent from the description and drawings, and from the claims.

DETAILED DESCRIPTION

This document describes technology for facilitating capture of audio signals in open-ear acoustic devices, and delivering the captured (and amplified) audio to user's ears such that the coupling between microphones and acoustic transducers is not significant, and the output of the acoustic transducers is low enough to not reach other people in the vicinity of the user. In addition, this document also describes feedforward and feedback noise reduction processes that allow for reducing the effect of audio coming from directions outside of one or more target directions. Such noise reduction, particularly in portions of the speech band, can result in at least 5 dB of improvement in signal to noise ratio (SNR), which in turn can improve speech perception/intelligibility even for users who do not have hearing loss. When combined with the directional capture of audio using microphone arrays, the technology described herein can allow a user to select the target direction from which audio is to be emphasized. For example, the target direction can be the direction at which a user is looking—referred to herein as the look direction or gaze direction of the user.

Figure 1A:
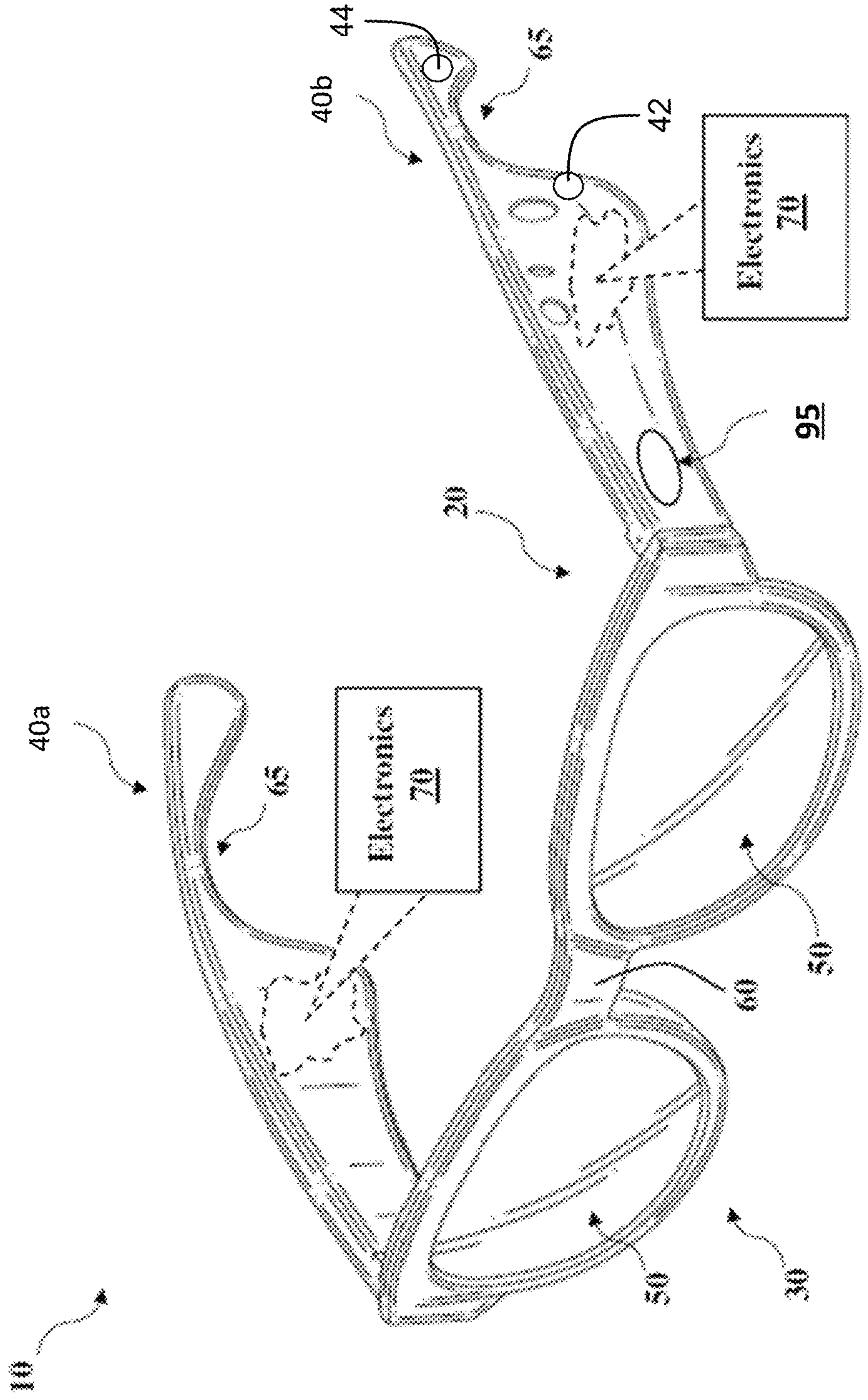
FIG. 1A shows a schematic depiction of a pair of audio eyeglasses as an example of an open-ear acoustic device.

FIG. 1A shows a schematic depiction of a pair or set of wearable audio eyeglasses 10 as an example of an open-ear acoustic device. As shown, the audio eyeglasses 10 can include a frame 20 having a frontal region 30 and a pair of arms (also referred to as temples) 40*a* and 40*b* (40, in general) extending from the frontal region 30. As with conventional eyeglasses, the frontal region 30 and arms 40 are designed for resting on the head of a user. The frontal region 30 can include a set of lenses 50 fitted to corresponding lens receptacles. The two lens receptacles are connected by a bridge 60 (which may include padding) for resting on the user's nose in a head-worn state of the audio eyeglasses. The lenses can include prescription, non-prescription and/or light-filtering lenses. Arms 40 can include a contour 65 for resting on the user's respective ears.

The frame 20 includes electronics module 70 and other components for controlling the audio eyeglasses 10 according to particular implementations. In some cases, separate, or duplicate sets of electronics module 70 are included in portions of the frame, e.g., each of the respective arms 40 in the frame 20. However, certain components described herein can also be present in singular form. Also, while the electronics module 70 is disposed in the arms 40 of the frame 20, in some implementations, at least portions of the electronics module 70 may be disposed elsewhere in the frame (e.g., in a portion of the frontal region 30 such as the bridge 60).

Figure 1B:
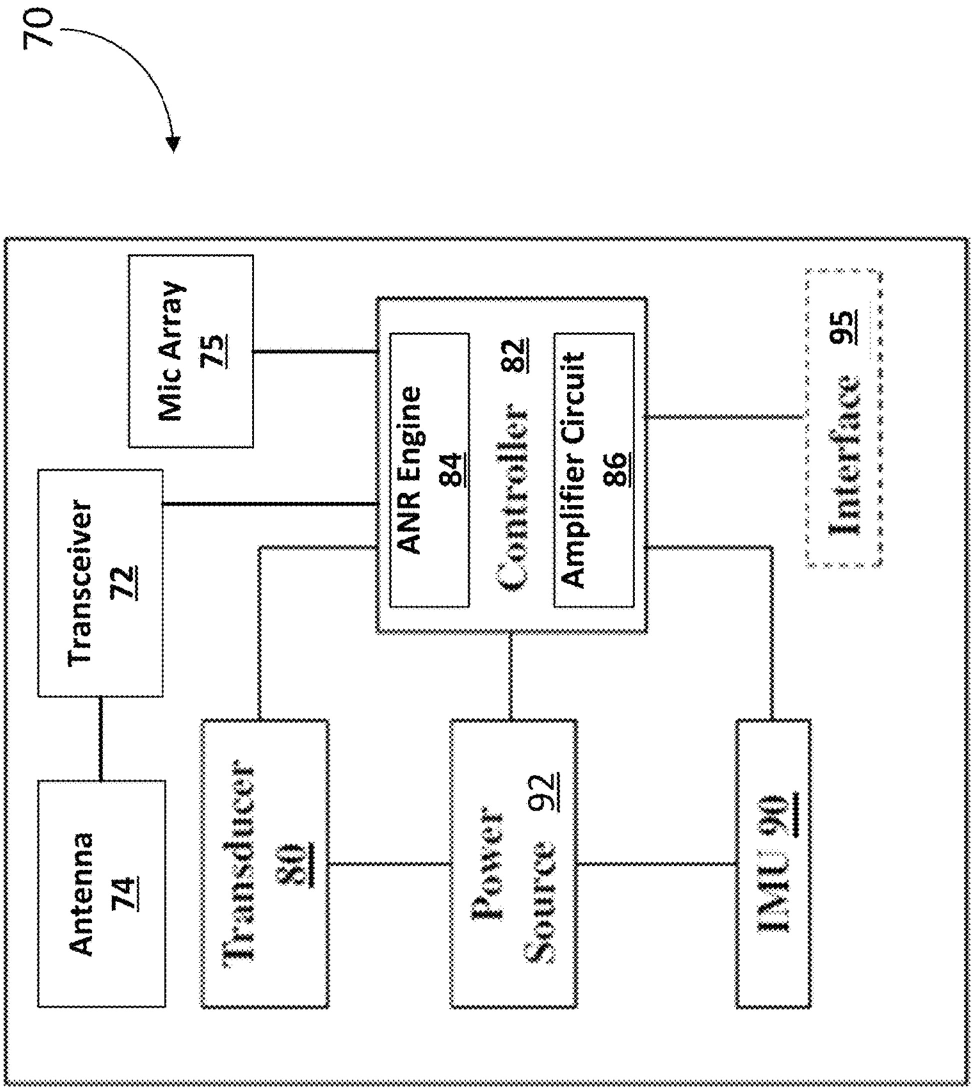
FIG. 1B is a schematic depiction of an electronics module included in the audio eyeglasses of FIG. 1A.

FIG. 1B is a schematic depiction of the electronics module 70 included in the audio eyeglasses of FIG. 1A. In some implementations, the components in electronics module 70 may be implemented as hardware and/or software, and such components may be connected to one another by hard-wired and/or wireless connections. In some implementations, the components described as connected or coupled to other components in audio eyeglasses 10 or other systems, may communicate over hard-wired connections and/or using communications protocols. In some implementations, the electronics module 70 includes a transceiver 72 and an antenna 74 that facilitates wireless communication with another electronics module and/or other wireless-enabled devices such as a mobile phone, tablet, or smartwatch. In some cases, the communications protocol(s) used by the electronics module 70 in communicating with one another can include, for example, a Wi-Fi protocol using a wireless local area network (LAN), a communication protocol such as IEEE 802.11 b/g, a cellular network-based protocol (e.g., third, fourth or fifth generation (3G, 4G, 5G cellular networks) or one of a plurality of internet-of-things (loT) protocols, such as: Bluetooth, BLE Bluetooth, ZigBee (mesh LAN), Z-wave (sub-GHz mesh network), 6LoWPAN (a lightweight IP protocol), LTE protocols, RFID, ultrasonic audio protocols, etc.

In some implementations, the electronics module 70 includes one or more electroacoustic transducers 80 disposed such that, in a head-worn state of the corresponding device, the one or more electroacoustic transducers 80 are in an open-ear configuration. This refers to a configuration in which there exists a physical separation between an ear canal of a user and the corresponding acoustic transducer such that the acoustic transducer (and/or other portions of the corresponding device) does not fully occlude the ear canal from the environment. For example, referring back to FIG. 1, an acoustic transducer 80 can be disposed on an arm 40 of the audio eyeglasses 10, such that the transducer 80 does not cover the ear canal of the user. In some implementations, at least two electroacoustic transducers 80 are positioned proximate to (but physically separated from) the ears of the user (e.g., one transducer 80 proximate to each ear. In some implementations, the one or more transducers 80 can be disposed to extend from the arms 40 such that they (or their respective housings or structures for interfacing with the ear) physically contact at least a portion of the ears of the user while not occluding the ear canals from the environment. It is noted, however, that while the audio eyeglasses 10 of FIG. 1A are shown as an example of a head-worn open-ear acoustic device, other types of open-ear devices are also within the scope of this disclosure. For example, the technology described herein can be used in open-ear headphones or other head-worn acoustic devices, examples of which are shown in U.S. Pat. Nos. 9,794,676, and 9,794,677, the contents of which are incorporated herein by reference.

In some implementations, each transducer 80 can be used as a dipole loudspeaker with an acoustic driver or radiator that emits front-side acoustic radiation from its front side, and emits rear-side acoustic radiation from its rear side. The dipole loudspeaker can be built into the frame 20 of the audio eyeglasses 10. In some implementations, an acoustic channel defined within the housing of the eyeglasses 10 (e.g. within the arms 40) can direct the front-side acoustic radiation and another acoustic channel can direct the rear-side acoustic radiation. A plurality of sound-conducting vents (openings) in the housing allow sound to leave the housing. Openings in the eyeglass frame 20 can be aligned with these vents, so that the sound also leaves the frame 20. In some implementations, the distance between the sound-conducting openings defines an effective length of an acoustic dipole of the loudspeaker. The effective length may be considered to be the distance between the two openings that contribute most to the emitted radiation at any particular frequency. The housing and its openings can be constructed and arranged such that the effective dipole length is frequency dependent. In certain cases, the transducer 80 (e.g., loudspeaker dipole transducer) is able to achieve a higher ratio of (i) sound pressure delivered to the ear to (ii) spilled sound, as compared to an off-ear headphone not having this feature. Exemplary dipole transducers are shown and described in U.S. patent application Ser. No. 16/151,541, filed Oct. 4, 2018; and Ser. No. 16/408,179, filed May 9, 2019.

The electronics module 70 can also include an array 75 of one or more microphones. In some implementations, the microphones in the array 75 can be used to capture audio preferentially from a particular direction. For example, each of the microphones in the array 75 can be inherently directional that capture audio from a particular direction. In other examples, the audio captured by the array can be processed (e.g., using a smart antenna or beamforming process) to emphasize the audio captured from a particular direction. In some implementations, the microphone array 75 captures ambient audio preferentially from a first direction (e.g., as compared to at least a second direction that is different from the first direction). For example, the microphone array 75 can be configured to capture/emphasize audio preferentially from the front of the frame 20 along a direction parallel to the two arms 40. In some cases, this allows for preferential capture of audio from a direction that coincides with the gaze direction of the user of the audio eyeglasses 10. In implementations where the captured audio is played back through the one or more acoustic transducers 80 (possibly with some amplification), this can allow for a user to change a direction of gaze to better hear the sounds coming from that direction, as compared to, for example, sounds coming from other directions. In some implementations, to facilitate such amplification, the electronic module 70 includes an amplifier circuit 86 that processes signals representing the audio captured using the microphones of the array 75, and generates driver signals for the one or more acoustic transducers 80. In some cases, this can be improve the user's perception of speech in noise environments. For example, even a 5-10 dB improvement in the ratio of power from a particular direction to the power from other directions can improve perception of speech, particularly when the improvement is within the speech band (e.g., in the 300-1500 Hz frequency band) of the audio spectrum.

The multiple microphones can be disposed in the corresponding device in various ways. For the example device (audio eyeglasses 10) of FIG. 1A, the one or more microphones of the array 75 may be disposed along an arm or temple 40 of the eyeglass frame 20. In some implementations, at least one microphone of the array 75 may be disposed in the frontal region 30 (e.g., on the bridge 60) of the frame 20. In some implementations, the microphones of the array 75 can be separate from any microphones that are disposed for the purpose of capturing the voice of the user (e.g., for spoken commands, phone conversations etc.). In some implementations, one or more microphones of the array 75 can also be used for capturing the voice of the user.

In some implementations, the locations of the microphones in the array 75 and the locations of the one or more acoustic transducers 80 can be jointly determined to implement an acoustics package that provides for directional audio delivery and capture in open-ear acoustic devices. For example, the locations of the transducers 80 and the microphones in the array 75 can be determined such that the transducers 80 satisfactorily deliver audio towards the ear of the user, without directing audio towards a microphone over a target or threshold amount. For example, the one or more acoustic transducers 80 and the multiple microphones of the array 75 can be disposed on a head-worn acoustic device (e.g., the audio eyeglasses 10) such that, in the head-worn state, a mainlobe of a radiation pattern of a directional acoustic transducer is directed towards the ear canal of the user, while a power ratio of (i) a portion of output of the one or more acoustic transducers radiated towards the ear canal of the user and (ii) a portion of output of the at least one acoustic transducer radiated towards a microphone of the array 75 satisfies a threshold condition. For example, a threshold condition can dictate that the above-referenced power ratio is at least 10 dB. In some implementations, the locations of the transducers 80 and the microphones of the array 75 can be determined while accounting for the directionality of the transducers, and/or the microphones, and/or the corresponding arrays.

In some implementations, the locations of the microphones of the array 75 are determined first, and the locations of the acoustic transducers 80 are then determined to achieve the target performances discussed above. For example, once the locations associated with the microphone array 75 are determined, the locations of the one or more acoustic transducers 80 are then determined such that the transducers 80 satisfactorily deliver audio towards the ear of the user, without directing audio towards a microphone of the array 75 over the target or threshold amount. Where a dipole transducer is used, the microphone(s) may be located in or near an acoustic null in a radiation pattern of the dipole transducer. In some cases, the microphone is positioned in a region in which acoustic energy radiated from a first radiating surface of the transducer destructively interferes with acoustic energy radiated from a second radiating surface of the transducer.

In some implementations, the electronics module 70 includes a controller 82 that coordinates and controls various portions of the electronic module 70. The controller 82 can include one or more processing devices that, in communication with one or more non-transitory machine-readable storage devices, execute various operations of the electronic module 70. In some implementations, the controller 82 implements an active noise reduction (ANR) engine 84 that generates driver signals for reducing the effect of audio signals that are considered as "noise." For example, in a particular use-case scenario, the audio captured from a particular direction (e.g., the gaze direction of a user) can be considered to be a signal of interest, and the audio captured from other directions can be considered to be noise. The ANR engine 84 can be configured to generate one or more driver signals that have phases that are substantially inverted with respect to the phases of the noise signal, such that the driver signals generated by the ANR engine 84 destructively interferes with the noise signal (based on the principles of superposition) to reduce the effects of the noise.

In some implementations, the ANR engine 84 can include multiple noise reduction pathways such as a feedback path and a feedforward path (generally referred to as ANR pathways, ANR signal paths) that require the use of microphones to capture corresponding reference signals. In some implementations, one or more microphones of the array 75 can be used as a microphone for an ANR signal path, and in such cases, the placement of the corresponding microphones can be governed by whether the microphones are used for capturing reference audio for feedforward path or a feedback path. However, to facilitate an understanding of such placements, a description of an ANR engine 84 is provided first.

Various signal flow topologies can be implemented in the ANR engine to enable functionalities such as echo cancellation, feedback noise cancellation, feedforward noise cancellation, etc. For example, as shown in the example block diagram of an ANR engine 84 in FIG. 2, the signal flow topologies can include a feedforward noise reduction path 210 that drives the output transducer 80 to generate an anti-noise signal (using, for example, a feedforward compensator 212) to reduce the effects of a noise signal picked up by the feedforward microphone 202. In another example, the signal flow topologies can include a feedback noise reduction path 214 that drives the output transducer 80 to generate an anti-noise signal (using, for example, a feedback compensator 216) to reduce the effects of a noise signal picked up by the feedback microphone 204. The signal flow topologies can also include an additional signal processing path 218 that includes circuitry (e.g., an echo canceller 220) for further improving the noise reduction performance of the ANR engine 84. In some implementations, the ANR engine 84 can include a configurable digital signal processor (DSP), which can be used for implementing the various signal flow topologies and filter configurations. Examples of such DSPs are described in U.S. Pat. Nos. 8,073,150 and 8,073,151, which are incorporated herein by reference in their entirety. The ANR engine 84 can also include one or more additional components such as an analog to digital converter (to convert the analog signal captured by a microphone to a digital signal that can be processed by a processing device), and a digital to analog converter (to convert the output of a processing device to a signal that is reproducible by a transducer 80).

In some implementations, the feedforward microphone 202 and/or the feedback microphone 204 can be included in the microphone array 75. In such cases, the locations for the feedforward microphone 202 and/or the feedback microphone 204 may be determined first, before determining the locations for the one or more transducers 80. For example, the feedback microphone 204 can be disposed on the device at a location such that in a head-worn state of the device, the feedback microphone 204 is located close to the ear of the user. This can result in a high degree of coherence between what the user actually hears and what the microphone captures. Referring back to FIG. 1A, the location 42 represents a possible location for the feedback microphone 204. An acoustic transducer 80 (e.g., a dipole) can then be placed such that the feedback microphone is located in the null of the dipole. This can be particularly advantageous in some applications, for example, when the audio eyeglasses 10 are being used as hearing aids. In some implementations, the feedback microphone may be at a location where the transfer function of an acoustic path between the transducer 80 and the microphone is similar in magnitude and phase to the transfer function of an acoustic path between the transducer and the ear canal. As such, configuring the ANR engine to control sound at the feedback microphone will yield similarly controlled sound at the ear canal, since this microphone location serves as an approximate proxy for the ear canal for sound from both the transducer and the environment. For a pair of audio eyeglasses 10, a feedforward microphone 202 can be placed, for example, at a location such that the microphone is located behind the pinna of a user in a head-worn state of the device. Referring back to FIG. 1A, the location 44 at the end of an arm 40 represents a possible location for a feedforward microphone. In some implementation, such behind-the-pinna location of the feedforward microphone 202 allows for effective feedforward cancellation of sounds coming from behind the user in a head-word state of the device, which in turn improves the perception of sounds coming from the frontal direction (e.g., that may coincide with the gaze direction of the user).

Figure 2:
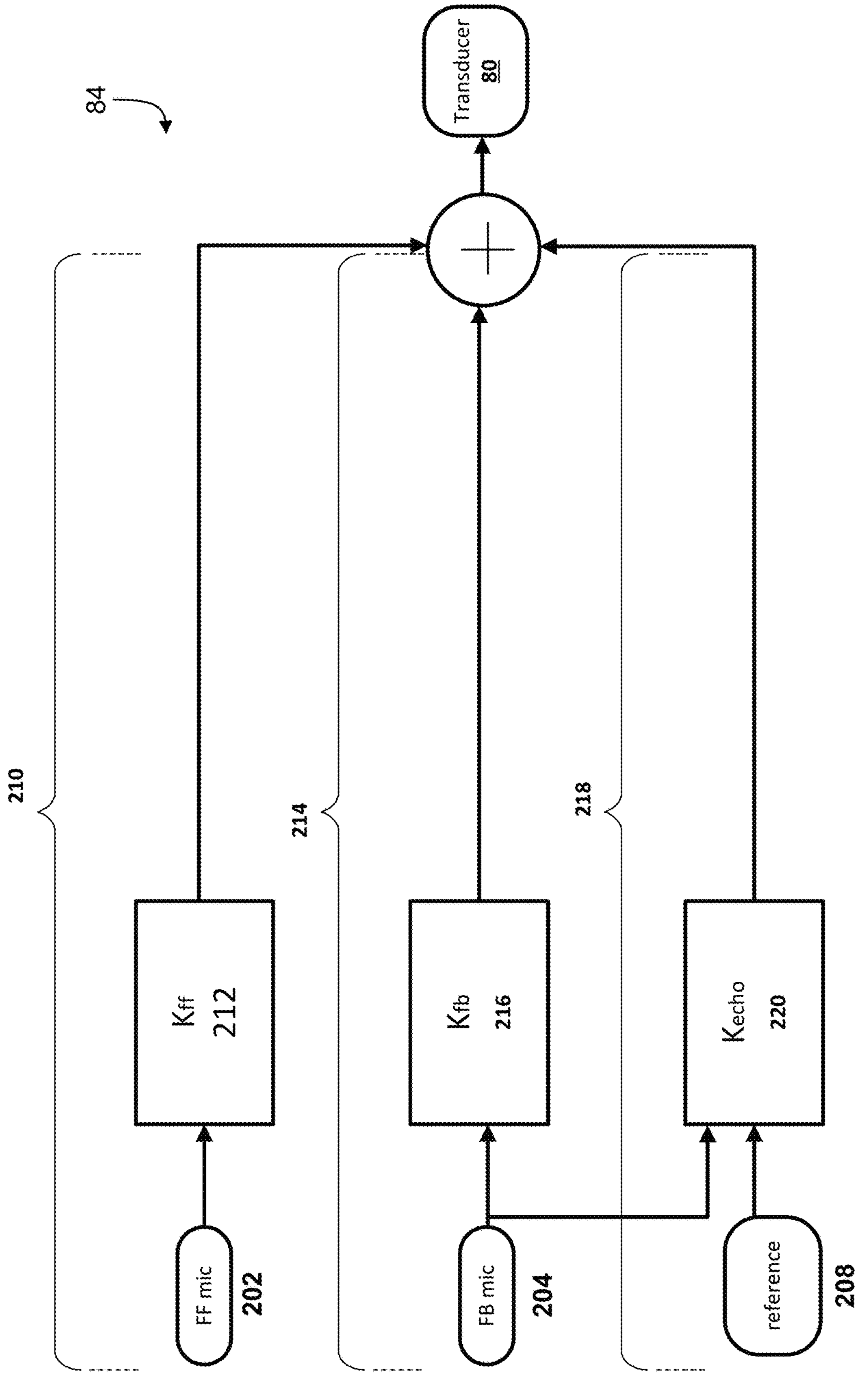
FIG. 2 is a block diagram of multiple signal paths in an ANR device.

In some implementations, the performance of an open ear device can be further improved by implementing an echo canceler (or echo cancellation circuit) that reduces the effects of any output of the transducer 80 as picked by a microphone such as the feedback microphone 204. For example, a reference microphone 208 can be used for picking up a different version of a signal that is also picked up or captured by the feedback microphone 204. Based on the two versions of the signal, an echo cancellation circuit ($K_{echo}$) 220 can generate an additional signal, which, when combined with the output of the feedback compensator 216, further reduces the effect of coupling between the transducer 80 and the microphones. While the echo cancellation circuit shown in the example of FIG. 2 is for canceling echoes pertaining to the feedback signal path, a similar echo canceler can be implemented for the feedback signal path with or without the echo canceler in the feedback path. In some implementations, the echo cancellation circuit includes a biquad filter that generates a reference signal for the echo cancellation (or feedback cancellation in case of hearing aids).

Referring back to FIG. 1B, the electronics module 70 can also include an inertial measurement unit (IMU) 90, and a power source 100. In various implementations, the power source 100 is connected to the transducer 80, and can additionally be connected to the IMU 90. Each of the transducer 80, IMU 90 and power source 100 are connected with the controller 82, which is configured to perform control functions according to various implementations described herein. The IMU 90 can include a microelectromechanical system (MEMS) device that combines a multi-axis accelerometer, gyroscope, and/or magnetometer. It is understood that additional or alternative sensors may perform functions of the IMU 90, e.g., an optical-based tracking system, accelerometer, magnetometer, gyroscope or radar for detecting movement as described herein. The IMU 90 can be configured to detect changes in the physical location and/or orientation of the audio eyeglasses 10 to enable location/orientation-based control functions. The electronics module 70 could also include one or more optical or visual detection systems located at the audio eyeglasses 10 or another connected device configured to detect the location/orientation of the audio eyeglasses 10. In any case, the IMU 90 (and/or additional sensors) can provide sensor data to the controller 82 about the location and/or orientation of the audio eyeglasses 10.

The power source 100 to the transducer 80 can be provided locally (e.g., with a battery in each of the temple regions of the frame 20), or a single battery can transfer power via wiring that passes through the frame 20 or is otherwise transferred from one temple to the other. The power source 100 can be used to control operation of the transducer 80, according to various implementations.

The controller 82 can include conventional hardware and/or software components for executing program instructions or code according to processes described herein. For example, controller 82 may include one or more processing devices, memory, communications pathways between components, and/or one or more logic engines for executing program code. Controller 82 can be coupled with other components in the electronics module 70 via any conventional wireless and/or hardwired connection which allows controller 82 to send/receive signals to/from those components and control operation thereof.

Referring back to FIG. 1A (and with continued reference to FIG. 1B), in certain implementations, the audio eyeglasses 10 include an interface 95, which is connected with the controller 82. In these cases, the interface 95 can be used for functions such as audio selection, powering on the audio eyeglasses or engaging a voice control function. In certain cases, the interface 95 includes a button or a capacitive touch interface. In some additional implementations, the interface 95 includes a compressible interface, which can allow a user to squeeze one or more sections of the audio eyeglasses 10 (e.g., arms 40) to initiate a user interface command. In some implementations, the interface 95 can include one or more microphones that are used for capturing spoken commands from the user. In some implementations, one or more microphones pertaining to the interface 95 can also be a part of the microphone array 75. In some implementations, the microphones of the interface 95 can be directional, or be a part of a directional array that captures sound preferentially from the direction of the user's mouth.

Figure 3:
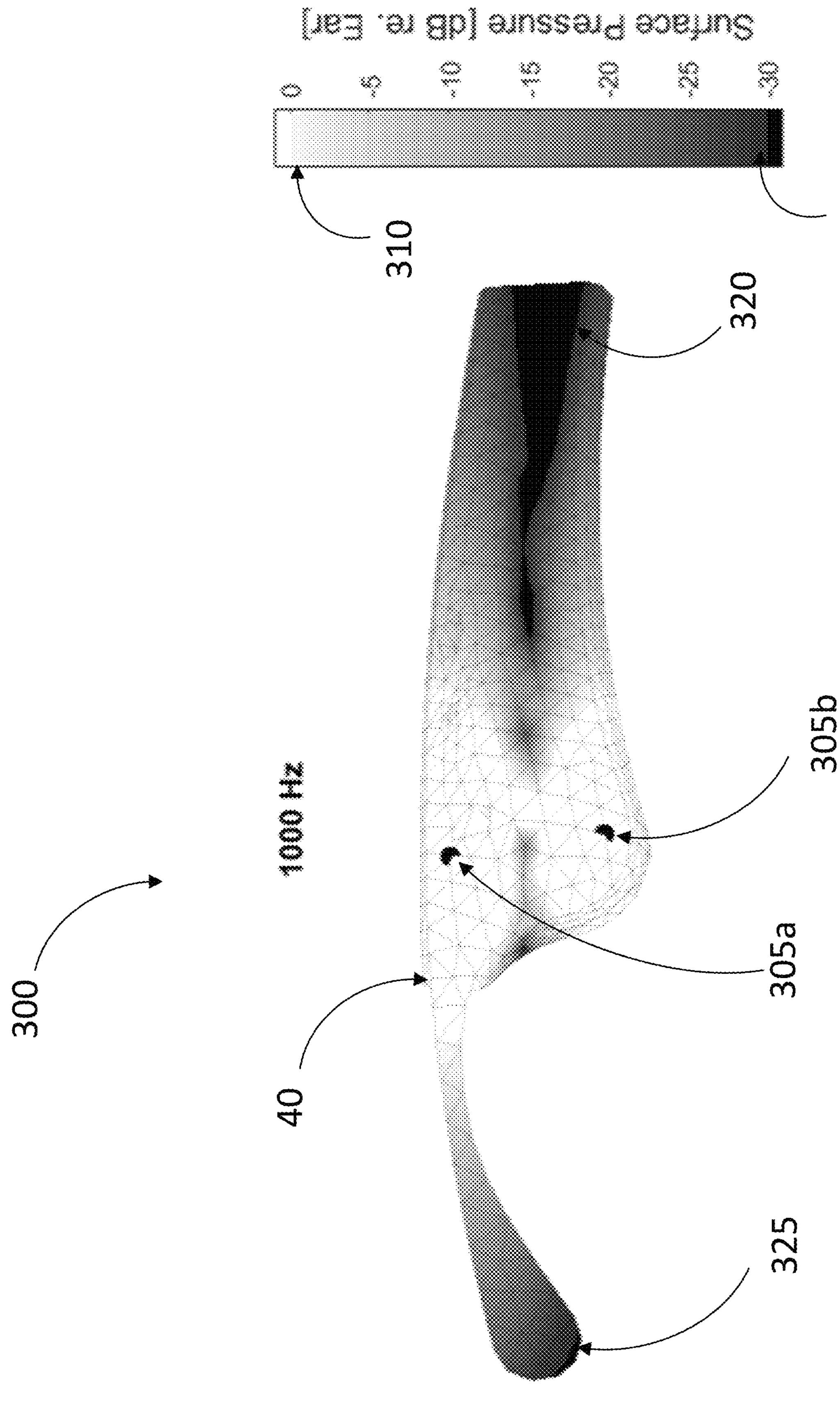
FIG. 3 is a heat map diagram illustrating an acoustic distribution over a surface of an arm of a pair of audio eyeglasses depicted in FIG. 1A.

FIG. 3 is a heat map diagram 300 illustrating an acoustic distribution over a surface of an arm 40 of a pair of audio eyeglasses depicted in FIG. 1A. Such an acoustic distribution diagram 300 represents the radiation pattern of the underlying one or more acoustic transducers, and can be used for placements of the one or more microphones in accordance with the technology herein. The heat map diagram can vary as a function of frequency, and diagrams for multiple frequencies or frequency ranges may need to be considered for determining optimal locations for acoustic transducers and/or microphones. The example of FIG. 3 illustrates the heat map diagram for 1000 Hz audio emanating from a dipole acoustic transducer (also referred to as an acoustic dipole) having two ends at the locations 405*a* and 405*b*, respectively. The heat map illustrates a distribution of surface pressure at various locations normalized with respect to a surface pressure at the ear. Therefore, the heat map tracks the variation in the ratio of two quantities—(i) $G_{od}$—amount of coupling between an acoustic transducer and a microphone placed at the corresponding location, and (ii) $G_{ed}$—amount of coupling between the acoustic transducer and a location of the ear—as a function of locations on the arm 40. The one or more microphones can be placed at locations where the ratio is low (or more negative when expressed in dB). Therefore, the shades that are towards the bottom 315 of the heat map legend represent good locations for placement of microphones, and shades that are towards the top 310 of the heat map legend represent locations where a microphone is likely to pick up audio that approximates what is heard at the location of the ear. In the example of FIG. 3, the area 320 represents locations where the ratio is very low (e.g., as expected at acoustic nulls in a radiation pattern of an acoustic transducer such as a dipole), making such locations suitable for placement of one or more microphones. Similarly, the ratio is very low at the location 325 (at the back end of the arm 40) making the location ideal for placement of one or more feedforward microphones 202 as described above with reference to FIG. 2. In some implementations, one or more feedback microphones 204 may be placed near the ear canal, in order to be coherent with the environmental sound signal at the ear canal. This can be done, for example, by placing the one or more feedback microphones along the heat map contours where the mapped ratio is approximately 0 dB, e.g., at the boundary between the lightest gray and white contours. In such cases the audio received from the transducer 80, as picked up by a feedback microphone, approximates the audio reaching the ear canal from the transducer 80.

While a distinction has sometimes been made between feedback and feedforward microphones, in acoustic devices such as open ear acoustic devices, a feedforward microphone could capture some amount of the transducer signal and thus have potential for feedback behavior. Therefore, the one or more microphones and their respective locations can be thought of more generally as being more or less able to capture either environmental sound signals or transducer sound signals coherent with the ear canal. Microphone locations corresponding to ratios close to unity (or approximately 0 dB) in the heat map may be better suited for accurately capturing the environmental sound signal at the ear canal at the expense of stability of the ANR system and vice-versa. Nonetheless, for a specific transducer and microphone system configuration, the ANR engine can be designed to account for those tradeoffs generally without making a rigid distinction between feedback and feedforward paths.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media or storage device, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). In some implementations, at least a portion of the functions may also be executed on a floating point or fixed point digital signal processor (DSP) such as the Super Harvard Architecture Single-Chip Computer (SHARC) developed by Analog Devices Inc.

Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A head-worn acoustic device comprising:

at least one acoustic transducer disposed such that, in a head-worn state, the at least one acoustic transducer is in an open-ear configuration in which an ear canal of a user of the head-worn acoustic device is unobstructed, and wherein the acoustic transducer is disposed within an arm of an eyeglass frame and configured (i) to radiate acoustic waves originating from a first side of the acoustic transducer through a first acoustic channel defined within the arm and (ii) to radiate acoustic waves originating from a second side of the acoustic transducer through a second acoustic channel defined within the arm;

at least two microphones configured to capture audio that is processed and played back through the at least one acoustic transducer;

an active noise reduction (ANR) circuit configured to operate on input from one or more microphones of the at least two microphones to preferentially reduce effects of (i) components of the audio captured using the at least two microphones from a first direction as compared to (ii) components of the audio captured using the at least two microphones from a second direction, wherein the ANR circuit is configured to reduce effects of audio components in a 300-1500 Hz frequency band; and an amplifier circuit configured to process signals representing the audio captured using the at least two microphones and generate driver signals for the at least one acoustic transducer, wherein the at least one acoustic transducer and the at least two microphones are disposed on the head-worn acoustic device such that, in the head-worn state, a lobe of a radiation pattern of the at least one acoustic transducer is directed towards the ear canal of the user, a feedforward microphone of the at least two microphones is positioned in an acoustic null in the radiation pattern of the at least one acoustic transducer and configured to capture audio originating from behind a head of the user as a portion of the input to the ANR circuit, and a feedback microphone of the at least two microphones is positioned outside of a direct acoustic path between the at least one acoustic transducer and an ear of the user such that an amount of coupling between the at least one acoustic transducer and the feedback microphone is substantially equal to an amount of coupling between the at least one acoustic transducer and the ear of the user.

2. The acoustic device of claim 1, wherein at least one microphone of the at least two microphones is disposed along a temple of an eyeglass frame.

3. The acoustic device of claim 2, wherein the at least one microphone is disposed on a front portion of the eyeglass frame.

4. The acoustic device of claim 2, wherein the at least one microphone is a portion of an array of multiple microphones disposed along the temple of the eyeglass frame.

5. The acoustic device of claim 4, further comprising one or more processing devices configured to implement a beamforming process based on audio captured using the multiple microphones of the array.

6. The acoustic device of claim 5, wherein the beamforming process is configured to preferentially capture audio from a gaze-direction of the user.

7. The acoustic device of claim 1, wherein a power ratio of (i) a portion of output of the at least one acoustic transducer radiated towards the ear canal of the user and (ii) a portion of output of the at least one acoustic transducer radiated towards the feedforward microphone is at least 1 dB.

8. The acoustic device of claim 1, wherein the at least one acoustic transducer is a part of an array of acoustic transducers.

9. The acoustic device of claim 1, wherein in the head-worn state, a physical separation exists between the at least one acoustic transducer and the ear canal of the user.

10. The acoustic device of claim 1, wherein in the head-worn state, a physical separation exists between the at least one acoustic transducer and a concha or pinna of the user.

11. The acoustic device of claim 1, wherein the at least one acoustic transducer comprises an acoustic dipole.

12. A head-worn acoustic device comprising:

at least one acoustic transducer disposed such that, in a head-worn state, the at least one acoustic transducer is in an open-ear configuration in which an ear canal of a user of the head-worn acoustic device is at least partially unobstructed, and wherein the acoustic transducer is disposed within an arm of an eyeglass frame and configured (i) to radiate acoustic waves originating from a first side of the acoustic transducer through a first acoustic channel defined within the eyeglass arm and (ii) to radiate acoustic waves originating from a second side of the acoustic transducer through a second acoustic channel defined within the eyeglass arm;

at least two microphones configured to capture audio that is processed and played back through the at least one acoustic transducer;

an active noise reduction (ANR) circuit configured to operate on input from one or more microphones of the at least two microphones to preferentially reduce effects of (i) components of the audio captured using the at least two microphones from a first direction as compared to (ii) components of the audio captured using the at least two microphones from a second direction, wherein the ANR circuit is configured to reduce effects of audio components in a 300-1500 Hz frequency band, wherein a feedforward microphone of the at least two microphones is positioned in an acoustic null in a radiation pattern of the at least one acoustic transducer and configured to capture audio originating from behind a head of the user as a portion of the input to the ANR circuit, and wherein a feedback microphone of the at least two microphones is positioned outside of a direct acoustic path between the at least one acoustic transducer and an ear of the user such that an amount of coupling between the at least one acoustic transducer and the feedback microphone is substantially equal to an amount of coupling between the at least one acoustic transducer and the ear of the user;

an amplifier circuit configured to process signals representing the audio captured using a first subset of the at least two microphones to generate a first signal for the at least one acoustic transducer; and an echo cancellation circuit configured to process the signals representing the audio captured using a second subset of the at least two microphones to generate a second signal for the at least one acoustic transducer, wherein a combination of the first signal and second signal reduces coupling between the at least one acoustic transducer and the at least two microphones by at least 3 dB.

13. The acoustic device of claim 1, wherein the feedforward microphone is disposed at a back end of a temple of an eyeglass frame at a position wherein a power ratio of (i) a portion of output of the at least one acoustic transducer radiated towards the ear canal of the user and (ii) a portion of output of the at least one acoustic transducer radiated towards the feedforward microphone is at least 1 dB.

14. The acoustic device of claim 1, wherein the feedback microphone is disposed along a temple of an eyeglass frame at a position wherein a power ratio of (i) a portion of output of the at least one acoustic transducer radiated towards the ear canal of the user and (ii) a portion of output of the at least one acoustic transducer radiated towards the feedback microphone is approximately 0 dB.

15. The acoustic device of claim 1, wherein the eyeglass frame comprises a plurality of openings to allow acoustic radiation from the acoustic transducer to leave the eyeglass frame.

16. The acoustic device of claim 15, wherein the plurality of openings comprises at least three openings that are arranged to define a frequency-dependent effective length of an acoustic dipole of the acoustic transducer.

17. The acoustic device of claim 1, wherein the feedforward microphone is positioned along the arm of the eyeglass frame at a location behind the ear of the user.

18. The acoustic device of claim 1, further comprising an interface configured to receive a command from the user, wherein the acoustic device is configured to perform one or more functions in response to the received command.

19. The acoustic device of claim 18, wherein then interface comprises a button or a capacitive touch interface.

* * * * *